(12) United States Patent
Ryadinskiy et al.

(10) Patent No.: US 11,333,594 B2
(45) Date of Patent: May 17, 2022

(54) MEASURING INSTRUMENT, SYSTEM AND METHOD FOR MEASURING THE MASS CONCENTRATION OF DUST PARTICLES

(71) Applicant: "Uniscan-Research" LLC, Novosibirsk (RU)

(72) Inventors: Anton Borisovich Ryadinskiy, Novosibirsk (RU); Aleksei Leonidovich Sterinovich, Novosibirsk (RU)

(73) Assignee: "CITYAIR" LIMITED LIABILITY COMPANY, Moscow (RU)

( * ) Notice: Subject to any disclaimer, the term of this patent is extended or adjusted under 35 U.S.C. 154(b) by 0 days.

(21) Appl. No.: 16/390,278

(22) Filed: Apr. 22, 2019

(65) Prior Publication Data
US 2020/0110018 A1 Apr. 9, 2020

(30) Foreign Application Priority Data
Oct. 3, 2018 (RU) .......................... RU2018134839

(51) Int. Cl.
*G01N 15/06* (2006.01)
*G01N 1/44* (2006.01)
*G01N 1/40* (2006.01)

(52) U.S. Cl.
CPC .......... *G01N 15/06* (2013.01); *G01N 1/4077* (2013.01); *G01N 1/44* (2013.01); *G01N 2001/4088* (2013.01); *G01N 2015/0693* (2013.01)

(58) Field of Classification Search
CPC ...... G01N 15/06; G01N 15/1436; G01N 1/44; G01N 1/4077; G01N 2001/2223; G01N 2001/4088; G01N 2015/0693; G01N 2015/0046; G01N 2015/1486; G01N 21/53; G01N 21/94; G01N 2291/0217; G01M 15/10; G01M 15/06
USPC .......... 356/432–440, 335–343, 73; 250/574, 250/575
See application file for complete search history.

(56) References Cited

U.S. PATENT DOCUMENTS

| | | | |
|---|---|---|---|
| 7,038,189 B2 * | 5/2006 | Kawai .................... | G01N 21/53 250/222.2 |
| 10,031,062 B2 * | 7/2018 | Kautzsch ............... | G01N 15/06 |
| 2014/0347663 A1 * | 11/2014 | Rodes .................... | G01N 21/53 356/338 |

(Continued)

FOREIGN PATENT DOCUMENTS

| | | |
|---|---|---|
| CN | 204116182 U | 1/2015 |
| CN | 205175980 U | 4/2016 |

(Continued)

*Primary Examiner* — Hoa Q Pham
(74) *Attorney, Agent, or Firm* — Muncy, Geissler, Olds & Lowe, P.C.

(57) ABSTRACT

A system for measuring the mass concentration of dust particles includes data transfer device with dust particles mass concentration meter located inside the device. The meter includes a housing of the meter, a printed circuit board with a microcontroller, at least two dust sensors and output interface of the meter connected to them. The data transfer device additionally includes a heating element and a fan, which are electrically connected to the microcontroller, at least one inlet channel connected to the dust sensors, at least one outlet channel and at least one inlet stream temperature sensor. A method for measuring the mass concentration of dust is also provided.

6 Claims, 3 Drawing Sheets

(56) References Cited

U.S. PATENT DOCUMENTS

| | | | |
|---|---|---|---|
| 2016/0153884 A1* | 6/2016 | Han | G01N 1/2205 |
| | | | 73/1.06 |
| 2016/0334320 A1* | 11/2016 | Cho | H04N 5/2256 |
| 2016/0349168 A1* | 12/2016 | Takasu | G01N 15/1459 |
| 2017/0115196 A1* | 4/2017 | Tsuboi | G01N 15/0205 |
| 2018/0017488 A1* | 1/2018 | Yang | G01N 15/0255 |
| 2018/0120278 A1* | 5/2018 | Hoorfar | G01N 33/497 |
| 2020/0064250 A1* | 2/2020 | Cai | G01N 15/0205 |

FOREIGN PATENT DOCUMENTS

| | | | |
|---|---|---|---|
| CN | 206114633 U | | 4/2017 |
| KR | 101320703 B1 | * | 10/2013 |

* cited by examiner

FIG. 1

Measuring instrument, system and method for measuring the mass concentration of dust particles

MEASURING INSTRUMENT, SYSTEM AND METHOD FOR MEASURING THE MASS CONCENTRATION OF DUST PARTICLES

CROSS-REFERENCE TO RELATED APPLICATIONS

This application claims benefit of Russian Application No. 2018134839 filed on Oct. 3, 2018.

The present invention relates to measuring instruments, in particular to instruments for measuring the air dustiness, namely to dust particles mass concentration meters and systems for measuring the mass concentration of dust particles.

Instruments for measuring air dustiness are designed to track changes in the level of atmospheric air pollution in residence buildings, in production areas or in the city. In today's large cities, such data play a key role in the environmental monitoring of industrial and construction sites, in predicting the environmental situation and in the development of recreational infrastructure. An additional difficulty is the measurement of the mass concentration of dust particles in the atmospheric air at a temperature below 0° C.

STATE OF ART

A technical solution disclosed in the utility model patent CN 205175980 U (IPC G01N 33/00; published Apr. 20, 2016) "Device for monitoring indoor air quality" is known, which is a system for measuring the mass concentration of dust particles that includes a housing and a printed circuit board with a microcontroller and a display connected to the microcontroller. The system is also equipped with a formaldehyde sensor, a temperature and humidity sensor, an ozone sensor, carbon monoxide and carbon dioxide sensors, a sensor for measuring the concentration of volatile organic compounds, a PM2.5 dust sensor, a PM10 dust sensor, two gas expansion slots, function buttons, a wireless connection unit, and a vacuum pump, which, in turn, are connected to the printed circuit board having the microcontroller.

Using this system, the method for measuring the mass concentration of dust particles is implemented as follows. The formaldehyde sensor, temperature and humidity sensor, ozone sensor, monoxide and carbon dioxide sensors, sensor for measuring the concentration of volatile organic compounds, PM2.5 dust sensor and PM10 dust sensor transmit the measured values to the microcontroller, which, after processing of them, outputs the processed data to the display and transmits them to an external device, such as a server, via the wireless connection unit.

A disadvantage of the known system and method is the impossibility of using them at subzero temperatures of air that enters the system.

A technical solution disclosed in utility model patent CN 206114633 U (IPC G01D 21/02, G01N 33/00; published Apr. 19, 2017) "Multiparameter online monitoring of dust" is known, which is a system for measuring the mass concentration of dust particles, including an RJ45 data cable, a Raspberry Pi base panel, a wireless connection unit (3G/4G router) and a sensor of environmental monitoring connected together using a printed circuit board. Moreover, the said environmental monitoring sensor includes: a wind speed sensor connected to an RS-458 cable with a direction sensor, which, in turn, is connected to a PM2.5 dust sensor and a TSP sensor that are connected, in turn, to the UART interface, and connected to sensors for temperature and humidity.

Using this system, the method for measuring the mass concentration of dust particles is implemented as follows. The environmental monitoring sensor including the wind speed sensor, direction sensor, PM2.5 dust sensor, TSP sensor connected to sensors for temperature and humidity measure these parameters and transfer them to the Raspberry Pi base panel, which, after processing the data, transmits them using the wireless connection unit to a third-party device, such as a server.

The system and method have several significant drawbacks, namely: the impossibility of measuring the concentration of dust particles at subzero temperatures of ambient air, the presence of only one dust sensor, which, in turn, measures the concentration of dust particles 2.5 μm in size (PM 2.5). Due to the absence of a replaceable sensor for measuring the concentration of dust particles, the existing sensor has a short service life and quickly wears out during the system operation.

As a prototype for the invention, well-known technical solution was chosen, which is described in utility model patent CN 204116182 U (IPC G01N 15/06; published Jan. 21, 2015) "High-precision device for detection of dust particles up to 2.5 μm in size (PM 2.5)", which is a system for measuring the mass concentration of dust particles, wherein which system includes a dust sensor, a microcontroller and a wireless connection unit, in which the dust sensor includes a PM 1 dust sensor and a PM 2.5 dust sensor and are connected to microcontroller, and the wireless connection unit is connected to the microcontroller and is used to receive data processed by the microcontroller, and to transmit data to a server via the network.

Using this system, the method for measuring the mass concentration of dust particles is implemented as follows. The PM 1 dust concentration measuring sensor is adjusted for a diameter of dust particles 1 μm, and the PM 2.5 dust sensor is adjusted for a particle diameter of 2.5 μm; both sensors are connected to the microcontroller that transfer dust particle concentration data in real time. After that, the system is turned on, the microcontroller receives the concentration values of particles from each sensor, after this the microcontroller calculates the concentration value of particles 2.5 μm in size as an absolute value of the difference between the received from PM 1 dust sensor and PM 2.5 dust sensor values. After that, the data from the microcontroller is transmitted to the server using a wireless connection unit.

The system and method have a number of significant drawbacks, namely the impossibility of measuring the concentration of dust particles at subzero temperature of the incoming air, the inability to measure the concentration of dust particles with a size of up to 10 μm by both sensors, as well as the short service life of dust sensors, due to the fact that both sensors are used simultaneously during measuring the concentration of dust particles.

DISCLOSURE OF THE INVENTION

The task of the claimed invention is the developing of a reliable dust particles mass concentration meter with an extended range of operating temperatures and long service life.

The technical result of the claimed invention in relation to the meter, system and method is the ability of the dust particles mass concentration meter to work at subzero temperatures of incoming atmospheric air with high accuracy and simple measuring the concentration of dust particles of up to 10 μm in size, as well as simple manufacturing of the claimed meter, improving its wear resistance and increasing the service life of the dust particles mass concentration meter.

In relation to the meter as part of the system, the claimed technical result is achieved by the fact that the dust particles mass concentration meter includes a meter housing, a printed circuit board with a microcontroller, at least two dust sensors connected to them and the meter output interface. The claimed dust particles mass concentration meter is characterized in that it additionally includes: a heating element and a fan, which are electrically connected to the microcontroller; at least one inlet channel connected to dust sensors, at least one outlet channel, at least one inlet stream temperature sensor.

An important difference of the claimed dust particles mass concentration meter is the providing of heat insulation for the meter housing. Such a construction of the dust particles mass concentration meter allows the temperature range of ambient atmospheric air entering the inlet channel to be expanded, while maintaining the required accuracy of measuring the mass concentration of dust particles and increasing the service life of dust sensors. The presence of the inlet stream temperature sensor allows to determine the initial temperature of the inlet air stream, and the amount of heat required to heat it to reach the operating temperature of dust sensors.

As one of the embodiments, the dust particles mass concentration meter can be equipped with at least two inlet channels, at least two outlet channels and at least two inlet stream temperature sensors. This embodiment allows to simplify the process of manufacturing the dust particles mass concentration meter, as well as to simplify the method for measuring the mass concentration of dust, since in the case of equipping the meter with two inlet and two outlet channels, there is no need to redirect the inlet air stream from one dust sensor to another.

As one of the embodiments, the dust sensors of the dust particles mass concentration meter can be equipped with nephelometers. This allows to measure the mass concentration of dust particles by the nephelometric method. This method of measurement is simple to implement and ensures a long service life of the dust particles mass concentration meter.

The inlet openings of the inlet channels and the outlet openings of the outlet channels can be equipped with filters, thus avoiding entering large debris and insects into the housing. In addition, the outlet channels can be additionally equipped with outlet stream temperature sensors. This allows to carry out additional control of the air temperature in the air quality control device. Also, the meter can be additionally equipped with sensors for ambient air temperature, humidity and atmospheric pressure, which allows to obtain information about atmospheric conditions in the process of measuring the mass concentration of dust particles.

The dust particles mass concentration meter can be supplemented with a data transfer device, forming a system for measuring the mass concentration of dust particles. Regarding the system for measuring the mass concentration of dust particles, the claimed technical result is achieved in that the system for measuring the mass concentration of dust particles includes a data transfer device with at least one inlet opening and at least one outlet opening.

The data transfer device is equipped with a battery, a power source connected to the communication block. The communication block of the data transfer device includes a controller connected to at least one input interface of the device, at least one output interface of the device, a non-volatile memory unit, a wireless connection unit, a real-time clock unit, a GSM antenna and GPS antenna.

The system for measuring the mass concentration of dust particles also includes a dust particles mass concentration meter. A distinctive feature of the claimed system is the fact that the dust particles mass concentration meter is located inside the housing of the data transfer device, and the inlet channels and outlet channels of the dust particles mass concentration meter are connected to the inlet and outlet openings of the data transfer device. This allows to supply atmospheric air to the dust particles mass concentration meter. In addition, the presence of the data transfer device in the system allows, on the one hand, to supply power to the dust particles mass concentration meter, and on the other hand, to transmit data in various ways, both wired and wireless. As one of the options for implementing the system for measuring the mass concentration of dust particles, the inlet opening of the data transfer device can be equipped with a flap for additional protection of the dust particles mass concentration meter from coarse debris and insects. Thus, an increase in the service life of the meter is achieved.

Also, in the case of equipping the data transfer device with an additional input interface of the device, the presence of an additional input interface of the device allows to establish connection to the system for the sensors that are responsible for measuring related parameters, such as concentration of ozone, carbon monoxide, carbon dioxide, formaldehyde in the air or any other substances. In addition, the data transfer device may include an additional output interface of the device. The presence of this interface allows to expand the capabilities of the data transfer device. An example of such an expansion of capabilities may be the possibility of updating the software of both the data transfer device and the dust particles mass concentration meter.

In addition, the non-volatile memory unit of the data transfer device can be configured to record the measured mass concentration of dust particles, the date and time of the measurement and their subsequent query. This allows to save the measured data in the event of a power failure from the power source or battery.

Regarding the method for measuring the mass concentration of dust, the claimed technical result is achieved by using a microcontroller to select a dust sensor, the temperature of incoming atmospheric air is measured, the air inside the meter is heated to a temperature of at least 0° C., the mass concentration of dust particles is measured, data is transmitted to the microcontroller, which processes them and transmits to the data transfer device using the output interface of the meter, the atmospheric air is removed through the output channel, the data transfer device transmits data to an external device via the wireless connection unit. This method for measuring the mass concentration of dust particles allows to measure the mass concentration of dust particles within an extended range of temperatures of incoming atmospheric air, as well as to increase the service life of the dust particles mass concentration meter.

One of the options for measuring the mass concentration of dust particles is to measure it by the nephelometric method. This method of measurement is simple to implement and ensures a long service life of the dust particles mass concentration meter.

In one of the embodiments of the claimed method for measuring the mass concentration of dust particles, the dust sensor is selected on the basis of data on the number of measurements made by each of the dust sensors, with each measurement using a dust sensor that measured fewer times.

In this case, switching between two dust sensors is carried out before measuring the mass concentration of dust particles. This allows to reduce power consumption and increase the service life of dust sensors and meter, respectively.

In one embodiment of the claimed method, the meter is turned on before the microcontroller starts the selection of a dust sensor. The data received from the microcontroller of the dust particles mass concentration meter to an external device can be transmitted via the output interface of the device. This allows to expand the range of possible methods of data transmission, as well as to transfer data even in case of failure of the wireless connection unit.

At the end of the measurement, it is possible to compare the average values of the measured data by dust sensors, which makes it possible to monitor the correctness of the data obtained by dust sensors during the measurement. In addition, the turning on dust sensors can be carried out immediately before the measurement, with turning off the dust sensors directly after it, which allows to reduce power consumption and increase the service life of dust sensors and the meter, respectively. Moreover, using this method the mass concentration of dust particles having a size less than 2.5 μm is measured. In addition, using this method the mass concentration of dust particles having a size of not more than 10 μm is measured. This separation is due to the difference in the upper limits of the range of measurement of the mass concentration of dust particles for dust particles having a size less than 2.5 μm, and for dust particles having a size in the range from 2.5 μm to 10 μm. Moreover, for dust particles having a size in the range from 2.5 μm to 10 μm, the upper limit of the range for measuring the mass concentration of dust particles is higher.

DESCRIPTION OF THE CLAIMED SOLUTION IN TERMS OF METER AND SYSTEM

Figure 1:
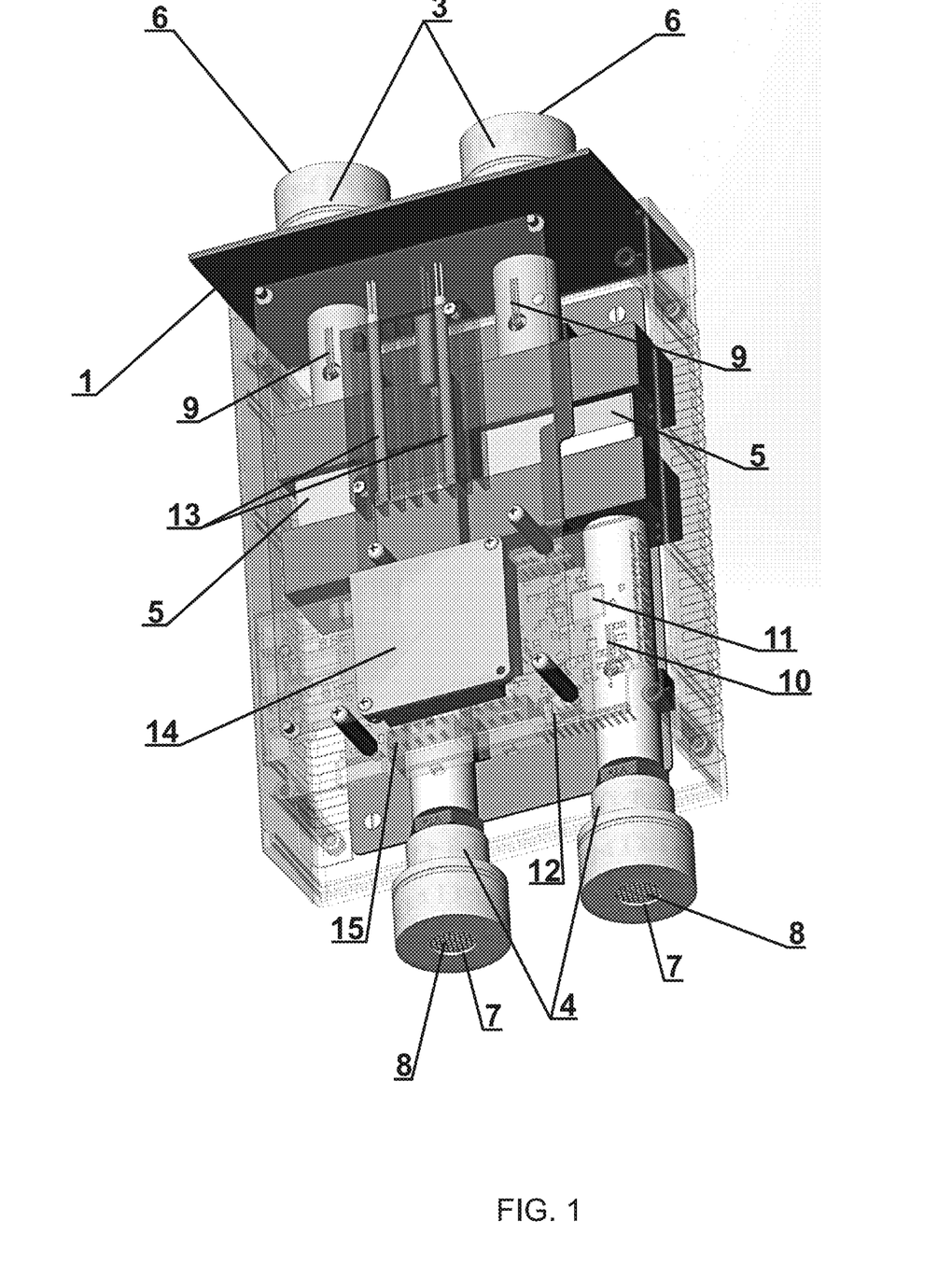
FIG. 1. The arrangement diagram of the main elements of the dust particles mass concentration meter.
Figure 2:
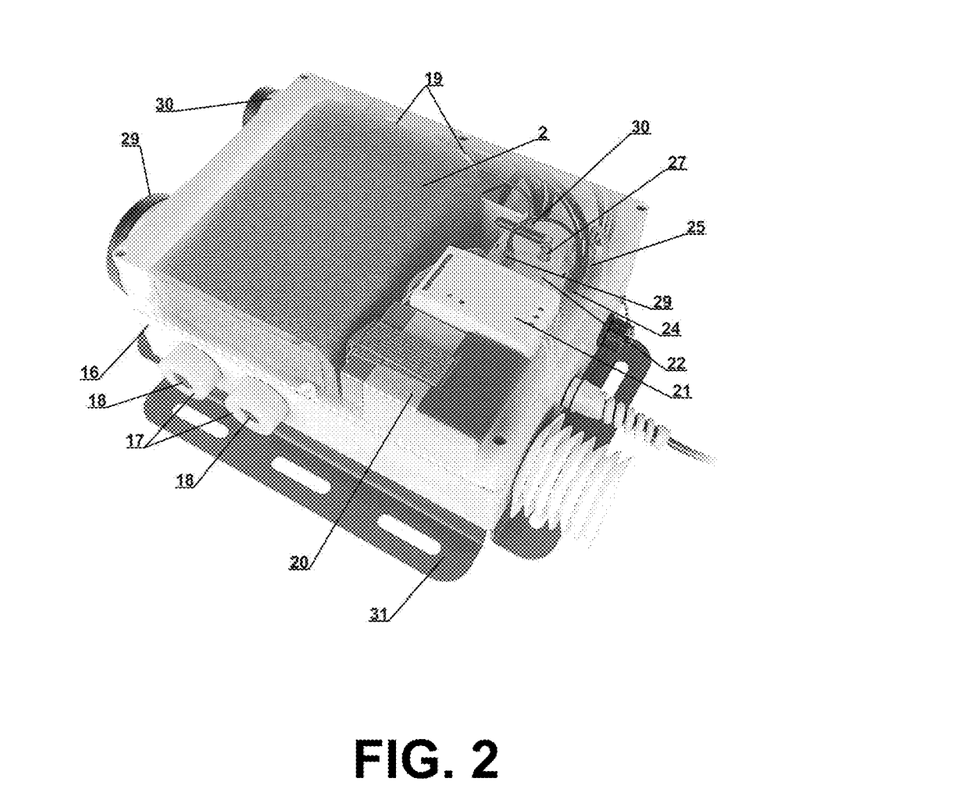
FIG. 2. The arrangement diagram of the main elements of the data transfer device with the dust particles mass concentration meter located inside.

The dust particles mass concentration meter includes the meter housing 1, thermal insulation 2, at least two inlet channels 3 with inlet openings 6, at least two outlet channels 4 with outlet openings 7, at least two dust sensors 5, filters 8, inlet stream temperature sensors 9, outlet stream temperature sensors 10, microcontroller 11, located on the printed circuit board 12, heating element 13, fan 14 and port 15.

The claimed dust particles mass concentration meter includes meter housing 1 provided with thermal insulation 2. Thermal insulation 2 can use K-FLEX AIR 10×1000-20 AD thermal insulation material or any other known thermal insulation material whose thermal conductivity factor is 0.03-0.04 W/(m·K) for the temperature range from −40 to +50° C., respectively. Thermal insulation 2 can be located both inside and outside the meter housing 1. As one of the embodiments, the meter housing 1 can be made of a heat insulating material, and in this case, the meter housing 1 is made combined with thermal insulation 2. At least one inlet channel 3, at least one outlet channel 4 and at least two dust sensors 5 are located inside the meter housing 1. Moreover, at the location of dust sensors 5 the inlet channel 3 is divided into two nozzles connected to dust sensors 5. In the place where the inlet channel 3 is divided into nozzles, there is a device for redirecting air stream, such as gate. On the other side, the sensors 5 are connected to the outlet channel 4 with nozzles. As one of the embodiments, two inlet channels 3, two outlet channels 4 and two dust sensors 5 can be used. Each inlet channel 3 is connected in series to dust sensor 5 and output channel 4. This embodiment allows to simplify the process of manufacturing of dust particles concentration meter. It also allows to simplify the process of switching between dust sensors 5, which, in turn, simplifies the method for measuring the mass concentration of dust particles. The inlet openings 6 of the inlet channels 3 and the outlet openings 7 of the outlet channels 4 are located outside the meter housing 1 and are equipped with filters 8, which are designed to prevent large debris and insects from entering the dust particles mass concentration meter. The dust sensors 5, in turn, include built-in fans, which allow to move atmospheric air at a constant speed from the inlet opening 6 of the inlet channel 3 to the outlet opening 7 of the outlet channel 4. The air flow rate carried out using the built-in fans of the dust sensors 5 can be, for example, 4-7 dm$^3$/min. As the fan of the dust sensor 5, a fan of any known construction can be used, which construction allows the fan of the dust sensor 5 to be built into the dust sensor 5. As an example of such a fan, a Sunon MagLev mc20100V3 fan can be used.

As one of the embodiments, dust sensors 5 can be used in the dust particles mass concentration meter, wherein the principle of operation of said dust meters is based on the standard nephelometric method for measuring the concentration of dust particles, that is, each dust sensor 5 can be equipped with a nephelometer. The principle of nephelometric method for measuring the concentration of dust particles is as follows. Through the scattering suspension, that is, the atmospheric air entering the dust particles mass concentration meter through the inlet openings 6 of the inlet channels 3, laser radiation with a given wavelength is transmitted. The scattered laser radiation coming from the scattering mixture (atmospheric air) is recorded by a photo detector located at a given angle to the laser radiation source, and based on the intensity of the scattered laser radiation, the mass concentration of dust particles is calculated.

Thus, the dust sensors 5 measure the mass concentration of dust particles in the atmospheric air. In the context of this application, the term "dust particles" means small solid particles of organic or mineral origin. Examples of such particles may also be soot or various aerosols. The size range of dust particles is divided into 2 areas (fractions): less than 2.5 μm (PM 2.5) and 2.5-10 μm (PM 10), with each dust sensor 5 capable of measuring the mass concentration of dust particles up to 10 μm in size, that is, capable of measurements in the range of PM 2.5 and PM 10.

The reduced error of measurement in the range of mass concentration of dust particles equal to 1-100 μg/m$^3$ for both PM 2.5 and PM 10 is ±25%. In the context of this application, the term "reduced measurement error" means an error calculated relative to the maximum value of the measurement range.

For PM 2.5, the relative measurement error in the range of mass concentration of dust particles equal to 101-1600 μg/m$^3$ is ±25%. In the context of this application, the term "relative measurement error" means an error calculated relative to the measured value.

In turn, for PM 10, the relative measurement error in the range of mass concentrations of dust particles equal to 101-3000 μg/m$^3$ is ±25%.

According to GOST 17.2.4.02-81 "Atmosphere. General requirements for methods for the determination of pollutants, the error of measurement should not exceed ±25% over the entire range of measured mass concentrations of dust particles. Thus, the values of relative and reduced measurement errors are permissible, since their values do not exceed the limit value of measurement error for dust particles in the entire range of measured mass concentrations of dust particles, providing acceptable accuracy for measuring the mass concentration of dust particles in the atmosphere.

The inlet channels 3 are also equipped with inlet stream temperature sensors 9, which are designed to measure the temperature of the inlet stream of atmospheric air, that is, the temperature of the atmospheric air entering through the inlet channel 3 to the dust particles mass concentration meter.

The outlet channels 4 can also be equipped with outlet stream temperature sensors 10. Thus, this allows to monitor the temperature of the air entering the building.

The dust sensors 5, inlet stream temperature sensors 9 and outlet stream temperature sensors 10 are electrically connected to the microcontroller 11 located on the printed circuit board 12. In turn, the microcontroller 11 is electrically connected to the output interface 15 of the meter located on the printed circuit board 12. An RS-485 interface, RS-232 interface or USB interface, or any other known wired data transmitting interfaces can be used as the output interface 15 of the meter. This allows to establish connection of dust particles mass concentration meter to the input interface 24 of the data transfer device, configured to subsequent data transmission to a third-party device, for example, a server. A microcontroller of any known construction, for example, an EFM32 HG222F64 microcontroller can be used as the microcontroller 11.

The meter housing 1 also includes heating element 13 and fan 14 electrically connected to the microcontroller 11. A ceramic heating element or any other known heating element can be used as the heating element 13. A fan of any known construction, for example, a fan BFB0512HA-CF00 can be used as the fan 14. The heating element 13 is designed to heat the air inside the meter housing 1, and the fan 14 is designed to circulate air and equalize its temperature inside the volume of the housing 1 of the meter. In combination with thermal insulation 2, this allows heating the atmospheric air in the inlet stream entering through the inlet channels 3 in the dust particles mass concentration meter to a certain temperature, for example, to a temperature of at least 0° C. At this temperature, it becomes possible to measure the mass concentration of dust particles by dust sensors 5. Moreover, the optimum temperature for measuring the mass concentration of dust particles in the air is the air temperature at least 5° C. At this temperature, it is possible to conduct accurate measurements of the mass concentration of dust particles without detriment to dust sensors 5, even if the initial temperature of the atmospheric air is below zero.

Moreover, the dust particles mass concentration meter can be additionally equipped with sensors for temperature of the ambient air, humidity and atmospheric pressure. This allows to obtain more accurate information about the state of the environment and the atmosphere, including in the process of measuring the mass concentration of dust particles.

In part of the system for measuring the mass concentration of dust particles, the claimed invention includes a data transfer device.

The data transfer device includes a device housing 16, equipped with at least one device inlet opening 17, equipped with a flap 18. A distinctive feature of the device housing 16 is the possibility of accommodating the claimed dust particles mass concentration meter. In such context this inlet opening 17 of the device is configured to its coaxial alignment with the inlet opening 6 of the inlet channel 3 of the dust particles mass concentration meter. Thus, the inlet opening 17 of the device is designed for receiving air flow into the device and the subsequent passing of air inlet stream into the dust particles mass concentration meter through the inlet openings 6 of the inlet channels 3. The flap 18 can be of any known construction, for example, in the form of a lid, and made of any known material, such as rubber. The presence of the flap allows to avoid entering large debris inside the data transfer device, and, consequently, into the dust particles mass concentration meter. Also, the data transfer device is equipped with at least one outlet port 19 of the device for removing the outlet stream, which outputs through the outlet openings 7 of the outlet channels 4 of the dust particles mass concentration meter to the outside. This is achieved due to the fact that the outlet opening 19 of the device is configured to its coaxial alignment with the outlet opening 7 of the outlet channel 4 of the dust particles mass concentration meter.

Inside the device housing 16, electrically connected battery 20, power source 21 and communication block 22 are also located. A battery of any known construction, such as a Delta HR12-7.2 battery, can be used as battery 20. Any known power source, for example, a DRC-100A power source can be used as the power source. The presence of the battery 20 allows to supply power to the device and the meter even in case of power outages in the network, as well as in case the power to the device is turned off. Dust particles mass concentration meter is also electrically connected to the battery 20 and the power source 21.

Figure 3:
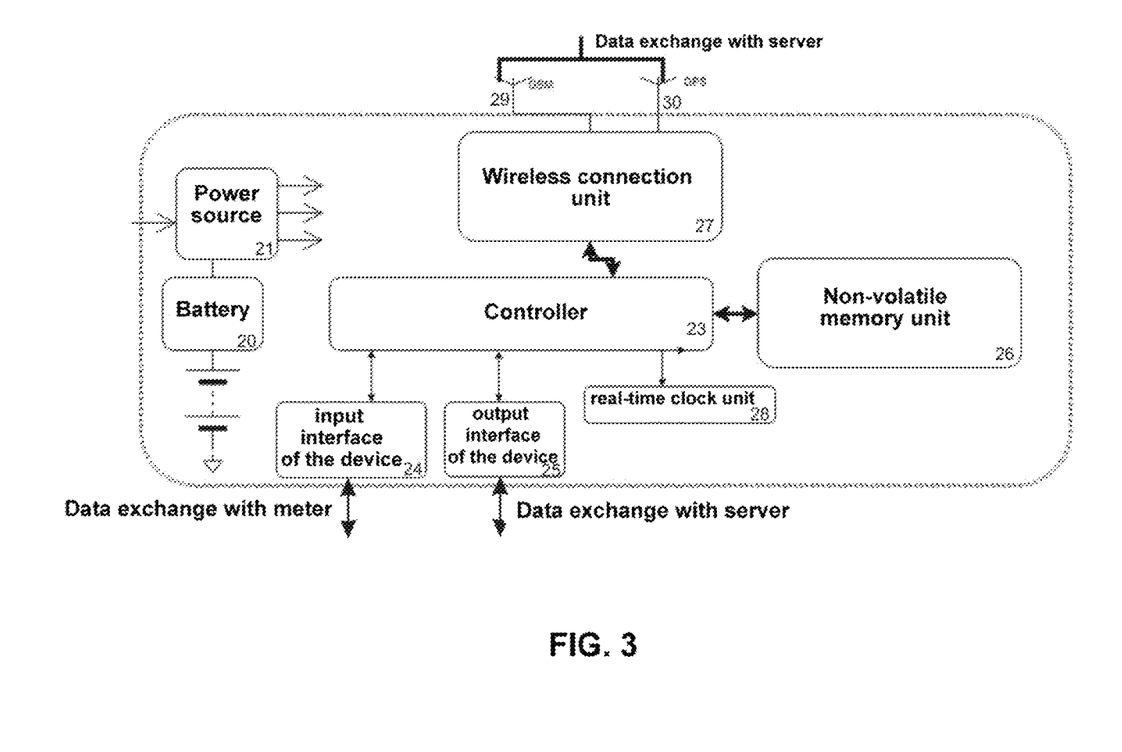
FIG. 3. Principle diagram of the data transfer device.

The communication block 22 includes a controller 23, at least one input interface 24 of the device, at least one output interface 25 of the device, a non-volatile memory unit 26, a wireless connection unit 27, a real time clock unit 28, a GSM antenna 29 and a GPS antenna 30. The controller may be of any known construction, for example, an EFM32 GG380F1024 controller. The input interface 24 of the device is designed to connect the output interface 15 of the meter to the input interface 24 of the device with the ability to transfer data from the dust particles mass concentration meter to the controller of the communication block 22 of the data transfer device. Any known wired data transmission interface, for example, an RS-485 interface can be used as an input interface 24 of the device. Any known wired data transmission interface, such as a USB interface or an RS-232 interface can be used as a device output interface 25. In the case the data transfer device is configured with more than one output interface 25 of the device, the additional output interface 25 of the device can be brought outside the communication block 22 and located on the device housing 16. The output interface 25 of the device is designed for wired data transmission from the dust particles concentration meter through a data transfer device to a third-party device, for example, a server, as well as transmitting data, even if the wireless connection unit 27 breaks down. It can also be used to update the software of the controller of the communication block 22 of the data transfer device, as well as the dust particles mass concentration meter.

In the case of configuring the data transfer device equipped with an additional input interface 24 of the device, the additional input interface 24 of the device allows to establish connection of various sensors to the communication block 22 of the data transfer device. Examples of such sensors may be a carbon monoxide sensor, a carbon dioxide sensor, an ozone sensor, a sensor for measuring the concentration of volatile organic compounds, a formaldehyde sensor, and so on. This allows to expand the capabilities of the dust particles mass concentration meter, due to the possibility of obtaining additional information about the state of the air in the process of measuring the mass concentration of dust particles.

Non-volatile memory unit 26 is designed to record data processed by the microcontroller 11 of the dust particles mass concentration meter. It is also intended for counting and recording the time from which dust sensors 5 and the meter are operated, respectively, also in the case when the power supply of the device and the meter is turned off. The presence of a non-volatile memory unit allows to save measured data on the mass concentration of dust particles in the atmosphere, the date and time of measurement with the possibility of their subsequent use, including in the case of a lack of power from both the power source 21 and the battery 20. Information about the current time and date from the real-time clock unit 28 is used when recording data to the non-volatile memory unit 26. The real-time clock unit of any known construction, for example. Maxim Integrated DS1339 can be used as the real-time clock unit 28.

A Wi-Fi unit, GSM modem, GPS unit as well as combination thereof, or any other known wireless connection unit can be used as a wireless connection unit 27. This allows remote control of the mass concentration of dust particles in the air.

The data transfer device is equipped with a GSM antenna 29 and a GPS antenna 30, which are connected to the wireless connection unit 27 of the communication block 22 and can be of any known construction. GSM antenna 29 and GPS antenna 30 are designed for wireless data transmission. Sensitive elements of the GSM antenna 29 and GPS antenna 30 are putted outside the outer surface of the device housing 16 to improve the quality of wireless data transmission.

For convenient mounting of the data transfer device and the dust particles concentration meter located intra-device, to the supporting surface, for example, the building wall, the device housing 16 is equipped with a universal bracket 31.

The data transfer device with the dust particles mass concentration meter located intra-device and connected to the data transfer device form the system for measuring the mass concentration of dust particles.

A distinctive feature of the claimed system for measuring the mass concentration of dust particles is the fact that the dust particles mass concentration meter is located inside the housing 16 of the data transfer device. Also, the inlet openings 6 of the inlet channels 3 and the outlet openings 7 of the outlet channels 4 of the dust particles mass concentration meter are connected to the inlet and outlet openings of the data transfer device. This allows for additional purification of atmospheric air entering the dust particles mass concentration meter from coarse debris and insects, thereby increasing the service life of the meter.

In addition, the presence of a data transfer device in the system allows, on the one hand, to supply power to the dust particles mass concentration meter, and on the other hand, to transmit the measured data in various ways, both wired and wireless.

BRIEF DESCRIPTION OF DRAWINGS

FIG. 1 shows the meter housing 1, inlet channels 3, outlet channels 4, dust sensors 5, outlet openings 7 of outlet channels 4, filters 8, inlet stream temperature sensors 9, outlet stream temperature sensors 10, microcontroller 11, printed circuit board 12, heating element, 13 fan 14 and the output interface 15 of the meter.

FIG. 2 shows the thermal insulation 2, the device housing 16, the device inlet openings 17, the flaps 18, the device outlet openings 19, the battery 20, the power source 21, the communication block 22, the input interface 24 of the device, the output interface 25 of the device, the Wi-Fi antenna of the wireless connection unit 27, GSM antenna 29, GPS antenna 30 and universal bracket 31.

FIG. 3 shows the battery 20, power source 21, controller 23, device input interface 24, device output interface 25, non-volatile memory unit 26, wireless connection unit 27, real time clock unit 28, GSM antenna 29 and GPS antenna 30.

DESCRIPTION OF THE METHOD FOR MEASURING THE MASS CONCENTRATION OF DUST PARTICLES

The method for measuring the mass concentration of dust particles using the claimed device is implemented as follows.

The data transfer device and dust particles concentration meter include. The power comes from the power source 20 to the battery 19 and then it is directed to the printed circuit board 12 of the dust particles mass concentration meter to the microcontroller 11. The microcontroller 11 processes the data from the inlet stream temperature sensors 9, and selects the dust sensor 5, based on data recorded in the memory unit 26. In such context, the microcontroller 11 makes the choice of the dust sensor 5 in such a way that when measuring the mass concentration of dust particles, the dust sensor 5 that measured fewer times is used. Atmospheric air enters through the inlet opening 17 of the device, equipped with a flap 18, through the filter 8 into the inlet opening 6 of the inlet channel 3 corresponding to the selected dust sensor 5. The atmospheric air entering into the inlet channel 3 is controlled by a fan built into the dust sensor 5.

Moreover, the microcontroller 11 turns on the heating element 13 and the fan 14, if necessary, thereby producing a uniform heating of the air inside the meter housing 1. This, in turn, leads to the heating of air entering the dust sensor 5 from the inlet channel 3, to the temperature required for measuring the mass concentration of dust particles, for example, to a temperature of at least 0° C. At this temperature, it becomes possible to measure the mass concentration of dust particles with dust sensors 5. In such context, the optimal temperature for measuring the mass concentration of dust particles in the air is temperature of the air at least 5° C. At this temperature, it is possible to measure mass concentration of dust particles with the required accuracy and without damage to dust sensors 5.

The dust sensor 5 measures the mass concentration of dust particles of the PM 2.5 fraction (up to 2.5 μm) or the PM 10 fraction (from 2.5 to 10 μm) in a continuous inlet stream of heated atmospheric air and transmits data to the microcontroller 11. The microcontroller 11 processes the data, transmits to the controller 23 of the communication block 22 of the data transfer device, which records the processed data in the nonvolatile memory unit 26 of the data transfer device and transmits via the wireless connection unit 27 to a third-party device, for example, such as a server or a mobile device. The second option is to transfer data from the dust particles mass concentration meter through the data transfer device to a third-party device, such as a server, using the output interface 15 of the meter connected to the input interface 24 of the device. The input interface 24 of the device is connected to the communication block 22 of the device, from which, in turn, data is transmitted via the output interface 25 of the device. The air enters the outlet channel 4, passes through the outlet opening 7 with the filter 8 and enters the premises through the outlet opening 19 of the data transfer device.

In case of supplying the dust sensor with a nephelometer, the measurement of the mass concentration of dust particles is carried out using the nephelometric method. This method of measurement is simple to implement and ensures a long service life of the dust particles mass concentration meter.

If the initial air temperature in the inlet channel 3 is higher than necessary and below the maximum allowable temperature for the operation of the dust sensors 5, measurement the mass concentration of dust particles is carried out using dust sensors 5. As an example, this option to measure the mass concentration of dust particles is implemented in the range temperatures of the inlet stream of air from 10° C. to 50° C.

Prior to measuring the mass concentration of dust particles, the microcontroller 11 switches between dust sensors 5 so that each next measurement uses the dust sensor 5 that measured fewer times. This allows to increase their service life by 2 times. When switching, simultaneous measurements of the readings of the two dust sensors 5 are carried out for a certain period of time, for example, 10 minutes. In such context, at the first minute, the measured values of the mass concentration of dust particles are not recorded to the non-volatile memory unit 26, after which the microcontroller 11 calculates the average value of the measured mass concentration of dust particles for each dust sensor 5. The time control by the microcontroller 11 is performed using the real time clock unit 28 of the communication block 22 of the data transfer device.

After that, the average values of mass concentrations measured in each dust sensor 5 are compared to each other. If the mean values differ from each other by more than a certain amount, for example, 50%, the microcontroller 11 transmits an error signal using a wireless connection unit 27 or using the meter output interface 15 connected to the device input interface 24, communication block 22, and output interface 25 of the device, respectively. Thus, it allows to determine the correctness of the data measured with dust sensors 5.

If the average values of mass concentrations measured in each dust sensor 5 do not differ from each other by more than a certain amount, for example, 50%, microcontroller 11 transmits data on the measured mass concentration of dust particles of that dust sensor 5 that measured more times. The microcontroller 11 transmits data to a third-party device using the wireless connection unit 27 or using the output interface 15 of the meter connected to the device input interface 24, the communication block 22, and the device output interface 25, respectively.

If the frequency of measurements of the mass concentration of dust particles is more than 5 minutes, the on/off mode for dust sensors 5 is provided to the dust particles mass concentration meter, which is implemented as follows. The power is supplied through the microcontroller 11 to the dust sensor 5 for a certain time before the measurement starts, for example, 5 minutes, but supplying is stopped immediately after receiving from the microcontroller 11 data from the dust sensor 5 about the measured mass concentration of dust particles. This is the time during which the dust sensor 5 will go into operation mode, that is, the error value of the measurements made by it will be within the allowable values. The time control by the microcontroller 11 is carried out using the real time clock unit 28 of the communication block 22 of the data transfer device. As an example, the frequency of measurements of the mass concentration of dust particles can be 1 time per day.

The claimed invention is technologically advanced and is wear resistant, durable and easy to use. The device can be manufactured using mass production, and the method for measuring the mass concentration of dust particles can be applied within any temperature range from −40° C. to +50° C.

What is claimed is:

1. A dust particles mass concentration meter, including a meter housing, a printed circuit board with a microcontroller, at least two dust sensors and the meter output interface connected to the at least two dust sensors, wherein said dust particles mass concentration meter additionally comprises:
   a heating element and a heating element fan, which are electrically connected to the microcontroller, the heating element and the heating element fan are independent from the least two dust sensors, thereby the at least two dust sensors measure a mass concentration of dust particles when the heating element and the heating element fan are not engaged;
   at least one inlet channel connected to dust sensors, the at least one inlet channel is positioned outside the meter housing;
   at least one outlet channel, the at least one outlet channel is positioned outside the meter housing; and
   at least one inlet stream temperature sensor,
   wherein the heating element and the heating element fan are positioned within the meter housing and outside the inlet channel and the outlet channel, and the heating element fan is configured to circulate air heated by the heating element within the meter housing thereby maintaining an optimal temperature within the meter housing for measuring a mass concentration of dust particles;
   wherein the meter housing is provided with a thermal insulation; and
   wherein the microcontroller uses one dust sensor of the at least two dust sensors for measuring the mass concentration of dust particles, the one dust sensor measuring the mass concentration of dust particles performed measuring fewer times than other at least two dust sensors.

2. The dust particles mass concentration meter according to claim 1, wherein said meter is equipped with at least two inlet channels, at least two outlet channels and at least two inlet stream temperature sensors.

3. The dust particles mass concentration meter according to claim 1, wherein the dust sensors are equipped with nephelometers.

4. The dust particles mass concentration meter according to claim 1, wherein an inlet opening of the inlet channel and an outlet opening of the outlet channel are equipped with filters.

5. The dust particles mass concentration meter according to claim 1, wherein the outlet channel is equipped with at least one sensor of the temperature of an outlet stream.

6. The dust particles mass concentration meter according to claim 1, wherein the dust particles mass concentration meter further comprises ambient air temperature sensors, humidity sensors and atmospheric pressure sensors.

* * * * *